US006678048B1

(12) United States Patent
Rienstra et al.

(10) Patent No.: US 6,678,048 B1
(45) Date of Patent: Jan. 13, 2004

(54) INFORMATION-EFFICIENT SPECTRAL IMAGING SENSOR WITH TDI

(75) Inventors: Jeffrey L. Rienstra, Albuquerque, NM (US); Stephen M. Gentry, Albuquerque, NM (US); William C. Sweatt, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 09/356,809

(22) Filed: Jul. 20, 1999

Related U.S. Application Data

(60) Provisional application No. 60/093,732, filed on Jul. 20, 1998.

(51) Int. Cl.[7] .................................................. G01J 3/51
(52) U.S. Cl. ........................................................ 356/419
(58) Field of Search ........................................ 356/419

(56) References Cited

U.S. PATENT DOCUMENTS

| | | | | |
|---|---|---|---|---|
| 4,382,267 A | * | 5/1983 | Angle | 348/298 |
| 4,790,654 A | | 12/1988 | Clarke | 365/310 |
| 5,379,065 A | | 1/1995 | Cutts | 348/269 |
| 5,410,371 A | | 4/1995 | Lambert | 348/769 |
| 5,424,543 A | | 6/1995 | Dombrowski et al. | 250/330 |
| 5,504,575 A | | 4/1996 | Stafford | 356/330 |
| 5,760,899 A | * | 6/1998 | Eismann | 356/326 |

OTHER PUBLICATIONS

W. M. Porter, H. T. Enmark, "A System of the Airborne Visible Infrared Imaging Spectrometer (AVRIS)," SPIE, vol. 834 Imaging Spectroscopy II (1987.

W. M. Porter, T. G. Chrien, E. G. Hansen, Charles M. Sature, "Evolution of the Airborne Visible/Infrared Imaging Spectrometer (AVIRIS) Flight and Ground Data Processing System," SPEI vol. 1298, Imaging Spectroscopy of the Terrestrial Environment (1990).

Lee J. Rickard, Robert Basedow, Ed Zalewski, Peter Silverglate, "HYDICE: An Airborne System for Hyperspectral Imaging," SPIE vol. 1937, p. 173.

R. W. Basedown, W. S. Aldrich, K. A. McVey, "HYDICE System Performance—An Update," SPIE, vol. 2821, Hyperspectral Remote Sensing and Applications, 1996, p. #2821–09.

\* cited by examiner

Primary Examiner—F. L. Evans
(74) Attorney, Agent, or Firm—Gregory A. Cone; George H. Libman

(57) ABSTRACT

A programmable optical filter for use in multispectral and hyperspectral imaging employing variable gain time delay and integrate arrays. A telescope focuses an image of a scene onto at least one TDI array that is covered by a multispectral filter that passes separate bandwidths of light onto the rows in the TDI array. The variable gain feature of the TDI array allows individual rows of pixels to be attenuated individually. The attenuations are functions of the magnitudes of the positive and negative components of a spectral basis vector. The spectral basis vector is constructed so that its positive elements emphasize the presence of a target and its negative elements emphasize the presence of the constituents of the background of the imaged scene. This system provides for a very efficient determination of the presence of the target, as opposed to the very data intensive data manipulations that are required in conventional hyperspectral imaging systems.

9 Claims, 7 Drawing Sheets

INFORMATION-EFFICIENT SPECTRAL IMAGING SENSOR WITH TDI

CROSS-REFERENCE TO RELATED APPLICATIONS

This application claims the benefit of U.S. Provisional Application No. 60/093,732 filed on Jul. 20, 1998. This application is also related to U.S. Ser. No. 09/345,604 filed on Jun. 29, 1999 for "Information-Efficient Spectral Imaging Sensor" which is incorporated herein by reference in its entirety.

STATEMENT REGARDING FEDERALLY SPONSORED RESEARCH

This invention was made with Government support under Contract DE-AC0494AL85000 awarded by the U.S. Department of Energy. The Government has certain rights in this invention.

BACKGROUND OF THE INVENTION

This invention relates to programmable multispectral filters that incorporate time delay and integrate electronics. The invention further relates to techniques for manipulating the data collected therefrom to identify scanned objects and to the specifics of the improved time delay and integrate (TDI) electronics themselves.

Spectroscopy is the discipline that analyzes the various spectral components of light emanating from a scene to determine what is in the scene or how it is acting in its environment. The light coming from the scene can be created in many different ways, but the immediate applications of the present invention will be concerned mostly with light from the sun or other light source that reflects off the materials in the scene that is then collected and processed by the sensor of this invention, although thermal imaging of infrared energy emanating from the scene is also of interest. By emphasizing the data containing the spectral content unique to a particular target or aspect of the scene, one can highlight that target or aspect and remove much of the clutter arising from the background environment. Much of the work in multispectral imaging has been done in the context of remote sensing by satellite-born sensors, although use of these processes is not limited thereto. The analyzed content of the remotely sensed images is useful in areas including agriculture, meteorology, oceanography, geological exploration, and various national security missions. Spectral imaging sensors have been shown to provide information far superior to that of conventional panchromatic images in many of these applications. These imagers are not limited to satellite applications and, as such, have terrestrial uses in the medical and manufacturing fields as well.

As the technology to build the photodetector arrays that measure the strength of the light in a particular spectral bin has improved, the number of channels (spectral bins) that can be sensed for a particular sample point (or pixel) has increased dramatically over the last few years. However, the light coming from the target/background is fixed, and as one increases the number of spectral channels per pixel, the signal to noise ratio in any one channel will decrease. Also, the data rates of spectral imaging sensors (10 Mbytes/sec, or more) stress the limits of the electronics systems, including the onboard data storage, the downlink bandwidth, and the earthbound image analysis system. The newest conventional multispectral sensors are called hyperspectral imagers (HSI). These sensors can record hundreds of spectral channels for each of the pixels in its array, with a typical array containing hundreds or thousands of pixels. A pixel herein is typically the patch on the ground that defines the minimum resolution of the system in which to look for a target. An HSI system offers the maximum of flexibility for post-collection analysis of the multispectral data but at an immense price in terms of data that needs to be transmitted, stored and processed.

The following references teach various approaches for collecting and processing multispectral data. U.S. Pat. No. 4,790,654 to Clarke discloses a programmable multispectral filter having means to receive a multispectral image, means to disperse the image into multiple spectral components, means to modulate the strength of the light in each spectral component, and means to reflect the modulated component back to the dispersing element for recombination of the multiple spectral components into a filtered whole image. The system can split the dispersed light into two separate channels by polarization for separate modulation in each channel. However, its optics are quite primitive. The spectral modulation is done at the pupil plane, which restricts its use to very small images with very few pixels. Although two channels can be processed at once, there is no mention of using spectral basis vectors that are developed by differencing two orthogonal channels as the means for modulating the light in the spectral bands in each channel. No reason is given for having a two channel capability, presumably one uses one channel to look for one thing and the other channel to look for another thing.

U.S. Pat. No. 5,379,065 to Cutts discloses selecting wavelengths of light that are transmitted using a spectrally agile filter (SAF). A specific embodiment of an SAF is an acousto-optic (AO) cell, where the dynamic grating in the AO cell is tuned to diffract only the wavelengths of interest. The detector is a charge coupled device (CCD) array operating in the shift-and-add mode, also known as the Time Delay and Integrate (TDI) mode. This is a two-dimensional detector that reads out only one line of pixels at a time.

U.S. Pat. No. 5,410,371 to Lambert discloses an AO tunable filter system for selecting wavelengths, one at a time. This system performs hyperspectral imaging, but not all of the wavelengths are simultaneously read; therefore, relatively longer data collection times are required than for the Cutts system.

U.S. Pat. No. 5,424,543 to Dombrowski et al discloses a method of taking hyperspectral data of a fixed scene, i.e., one for which high speed imaging is not required. A two-dimensional image is viewed serially using a series of narrow band filters such that many frames of the same image are viewed through different spectral filters.

U.S. Pat. No. 5,504,575 to Stafford discloses a spatial light modulator spectrometer. The spectrometer has collimating means, dispersing means to separate the light assigned to a particular pixel into its various spectral components, a multiplicity of spatial light modulators acting upon the dispersed light from each pixel, and recombination means to refocus the individual, now-modulated spectral components of light back into the individual pixels from whence they came. The spatial light modulators here are digital micromirrors, labeled therein as deformable mirror devices. This is a single channel spectrographic system only, not an imager.

The last references disclose two airborne systems that can collect 128–256 spectral components for each pixel scanned. These are (1) "AVIRIS" (Airborne Visible-InfraRed Imaging Spectrometer)—see W. M. Porter, H. T. Enmark, "A System of the Airborne Visible/ Infrared Imaging Spectrometer (AVIRIS)", SPIE, Vol. 834, *Imaging Spectroscopy II*, 1987 and W. M. Porter, T. G. Chrien, E. G. Hansen, Ch. M. Sature, "Evolution of the Airborne Visible/Infrared Imaging Spectrometer (AVIRIS) Flight and Ground Data Processing System", SPIE, Vol. 1298,1990, pp. 11–17); and (2) "HYDICE" (Hyperspectral Data Image Collection Experiment)—see L. J. Rickard, R. W. Basedow, E. Zalweski, P. Silverglate, and M. Landers, "HYDICE: An Airborne System for Hyperspectral Imaging," SPIE, Vol. 1937, *Imaging Spectrometry of the Terrestrial Environment*, 1993, p. 173 and R. W. Basedow, W. S. Aldrich, K. A. McVey, "HYDICE System Performance: An Update," SPIE, Vol. 2821; *Hyperspectral Remote Sensing and Applications*, 1996, Paper # 2821-09. Both AVIRIS and HYDICE require significant digital post-processing of the conventional spectral data to identify the materials scanned.

Although these above references demonstrate the progress that has been made in multispectral and hyperspectral imaging, there remains a need in the art from an even more advanced and efficient means of collecting and processing multispectral data for target identification.

BRIEF SUMMARY OF THE INVENTION

This invention presents a new system and method for optically processing hyperspectral data on a pixel-by-pixel basis and providing for utilization of all n spectral bins for each pixel, as necessary, to emphasize a particular aspect or aspects of a scanned scene or to provide an indication or not of whether a target is present in an imaged scene. Although the mathematics behind this technique have been known for some time and have been used for post-collection electronic processing of hyperspectral data, they are applied in a new way herein to diminish, if not eliminate, the need to collect, store, and transmit for electronic processing the entire hyperspectral data set for an image scene.

The present system relies in part upon a new type of time delay and integrate (TDI) electronics that provides for variable gain and switching off of selected channels. The variable gain TDI can be employed at the focal plane of the optical system, and by doing so can avoid the need for many of the optical components used in the sister patent application referenced above. The variable gain aspect of the TDI electronics can be rapidly reconfigured to adjust the sensor system to a different attenuation levels required by a new spectral basis vector, as discussed below. This ability to change the system response on the fly, as it were, is especially valuable in satellite-based sensor systems. This new type of TDI electronics may also find applications beyond those related to the disclosed multispectral imaging system.

The present system also relies upon a spectral basis vector to emphasize the desired signal returns and to de-emphasize the undesired signals by taking the dot product of the radiance vector, consisting the magnitudes of the radiation in all the spectral bins for a particular pixel, and the spectral basis, which acts to filter out the undesired signals. The spectral basis vector is the result of an affine transformation that is performed on a training set of data and has both positive and negative components. The positive and negative components can be utilized separately in different channels, or they can be transformed again to an all positive modified spectral basis vector that can be used in a single channel. The spectral basis vector is explained in more detail below.

This invention reduces the dimension of the spectral data to a few channels per pixel from the hundreds required in a classic hyperspectral imaging system (HIS). It also significantly improves the signal-to noise (S/N) ratio for a given computation while reducing the need for high data rate systems with their concomitant weight and complexity burdens. When used in mapping or geophysical applications, these two improvements allow the programmable hyperspectral sensor of the present invention to search huge areas rapidly, yet with high resolution. When used in other applications, such as medicine, the improvements permit near real-time identification and analysis of targets in data-rich environments. Finally, it uses the encoded spectra directly thus simplifying classification and quantification.

DETAILED DESCRIPTION OF THE INVENTION

The novel combination of the selectivity of the spectral basis vector and the variable gain TDI electronics results in an elegant solution to a very complicated problem.

This invention is based in part upon a new technique to utilize some reasonably well known mathematics to do hyperspectral filtering. As in most forms of hyperspectral filtering, one begins with a data base of collected spectra of many different types of materials-all the different background materials one expects to see in meaningful amounts and all the targets one is seeking in the scanned images. This data base, often called a training set, is collected with the same type of sensor system one will be using later to detect the targets. The sensor system will have a similar number of spectral bins that in which the light from the imaged scene analyzed and the same photodetector response as does the sensor that will be used to detect the target. In this manner, one will know beforehand what spectral bins (wavelengths) contain the information most useful to detect a particular target or the background and the relative amplitude of the light in the selected bins. This preliminary data will consist of a signal strength of from zero to some positive value in each of the spectral bins across the relevant spectrum for all the tested materials in the training set.

In a normal n-dimensional hyperspectral data set (defined by the n spectral measurements) for a scanned scene containing background and target(s), there will be a group of data points that will fall into a cluster (or clusters) that lie in a region (or regions) of the n-dimensional space that are separated from other regions of data points that describe the background information. However, at this preliminary stage, it is difficult to use this information directly.

By performing an affine transformation, one can define a new coordinate system that has a reference plane therein that separates the target data group from the background data groups in the transformed n-dimensional space. The affine transformation is performed on the training data set. The vectors are the definition of the optimal affine transformation to separate the spectral clusters contained in the scanned scene The vectors from the origin of the new coordinate system to the various transformed data points for the target and the background can be used to create a spectral basis vector that can act as a hyperspectral filter vector to pass information that maximizes the separation of the target from the background. This spectral basis vector is an arbitrary spectral transmission function with positive or negative weights assigned to each of the spectral bins, wherein the weights are derived through orthogonal subspace projection of the original n dimensional spectral data via the affine transformation discussed above.

Figure 1A:
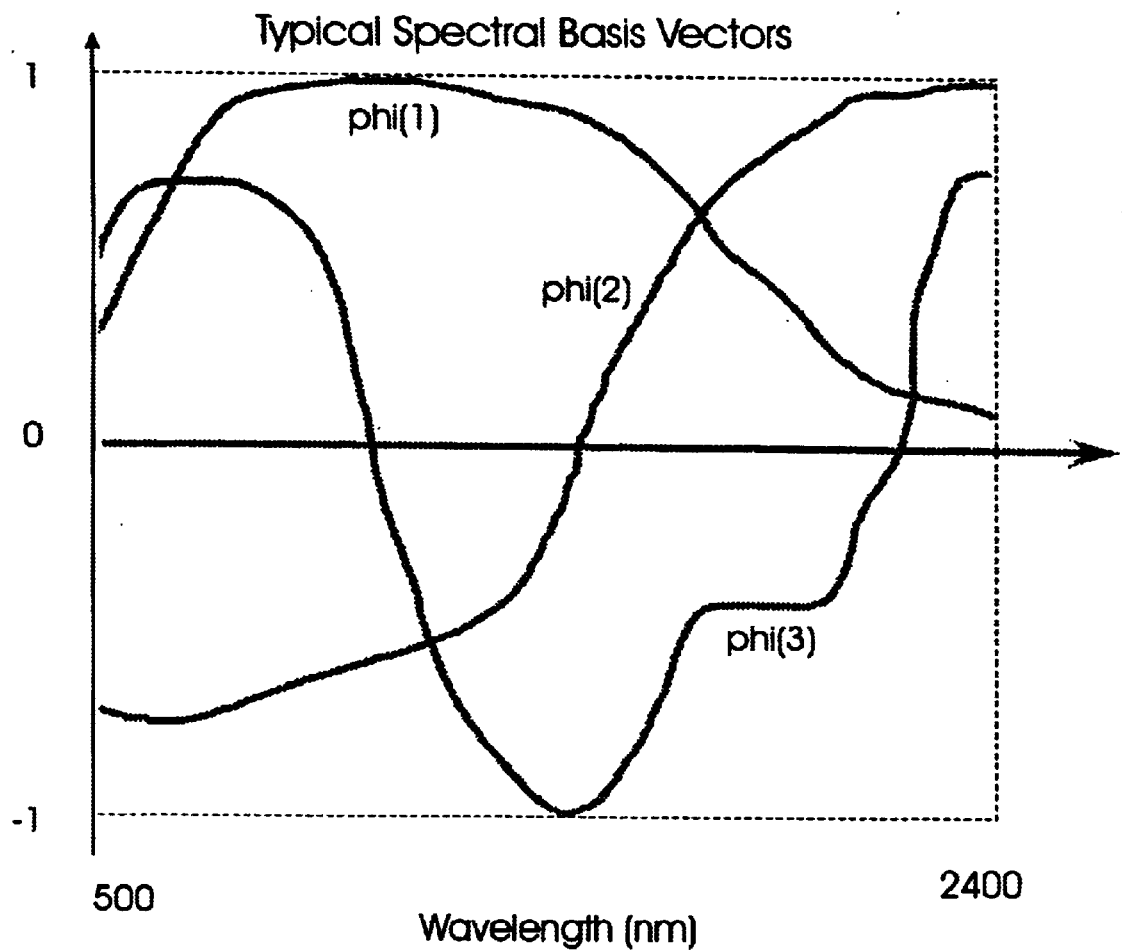
FIG. 1a is a graph showing three basis vectors.
Figure 2:
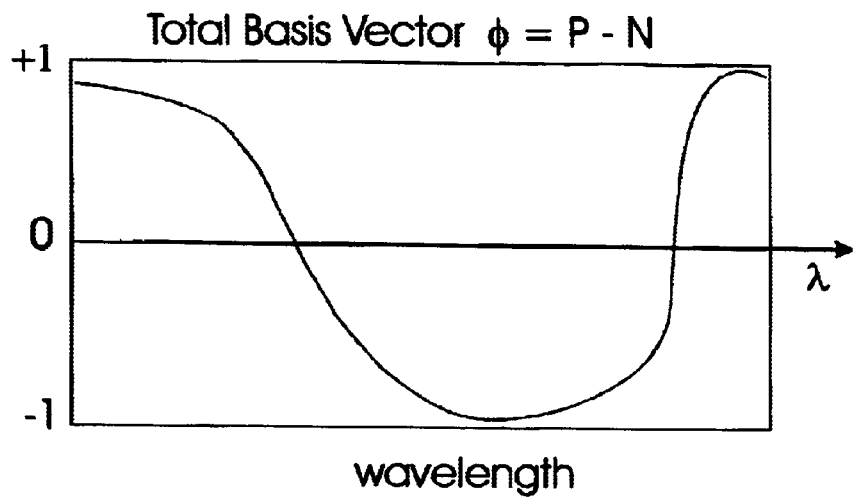
FIG. 2 is a graph showing a spectral basis vector created from data similar to that in FIG. 1b.
Figure 3A:
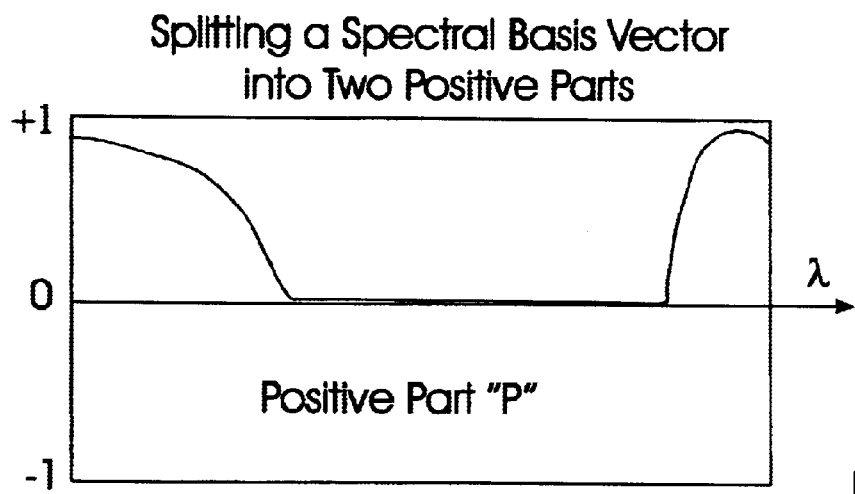
FIGS. 3a and 3b are graphs derived from FIG. 2 and show how the positive and negative portions of the spectral basis vector can be changed into two separate positive only basis vectors.
Figure 3B:
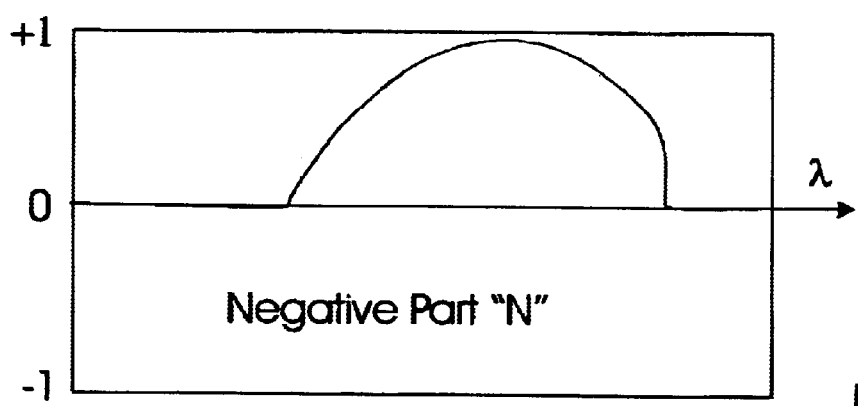

FIG. 1a shows three typical basis vectors taken across the usual spectral range and having values between 1 and −1. $\Phi_1$ is representative of an illumination source. $\Phi_2$ and $\Phi_3$ are basis vectors for materials, one of which could be a target and the other the background. The clustering of the target and background data is shown in FIG. 1a after an affine transformation has been made. A resulting spectral basis vector used to detect a particular material is shown in FIG. 2. FIGS. 3a and 3b show how the spectral basis vector of FIG. 2 with its positive and negative parts can be separated into two positive parts (with one being subtracted from the other in a subsequent combining operation. The spectral basis vector (there can be several spectral basis vectors that are handled separately) operates upon the hyperspectral data collected from the pixels in the imaged scene via a dot product operation to maximally separate the target and background samples in the scene.

Heretofore, the processing of hyperspectral data for an imaged scene with the spectral basis vector(s) has only been done in conventional electronic computers after the complete hyperspectral data set describing a scanned scene has been optically collected, read out as electronic signal strengths from detectors in each of the n spectral bins in each of the m pixels in each row of pixels in the detector for every row needed to capture the scene, stored and then sent to the electronic computer for processing with the pertinent spectral basis vector for the particular target being sought.

The advance herein is the recognition that much of the post-collection electronic processing can be avoided by creating an sensor system that will provide for the real-time analog computation of the dot product between vectors representing the collected data and the spectral basis vector within the electronics of the TDI system of the sensor itself.

There are a number of techniques to generate spectral basis vectors from a hyperspectral data set of background materials and targets. These techniques include, but are not limited to principal components analysis (PCA), projection pursuit (PP), and independent component analysis (ICA), and factor analysis. Many of these techniques can be found in standard reference texts such as Fukunaga, *Introduction to Statistical Pattern Recognition*, Academic Press, 1990; Everitt, *Cluster Analysis*, Halsted Press, 1993; Jackson, *A Users Guide to Principal Components*, John Wiley and Sons, 1991; Scott, *Multivadate Density Estimation Theory, Practice and Visualization*, John Wiley and Sons, 1992. The principal components analysis method works well and is described in more detail below.

The general problem is described by the matrix equation below.

$$O = S \cdot \Phi \qquad \text{Eq. 1}$$

Where 0 is the observed vector produced after the conventional spectrum vector S of the scene has been encoded by the encoding matrix $\Phi$. The encoding matrix $\Phi$ is a square matrix of dimension n equal to the number of spectral elements or bins and is implemented in the real world as a truncated version thereof by the action of the spatial modulators in the sensor optics. The size of the matrices of Eq. 1 is as follows:

$$[1 \times n] = [1 \times n] \cdot [n \times n] \qquad \text{Eq. 2}$$

But what is needed is a truncated version of the transpose of $\Phi$ that will approximately recover the original scene vector S from the observed vector $\mathbf{0}$ ($\mathbf{0} \cdot \Phi^t \approx S$). Here $\mathbf{0}$ will have the dimension of $[1 \times m]$, and the truncated version of $\Phi$ will have the dimensions $[1 \times m]$, where m is less than n.

One way to form this truncated encoding matrix is to use as its rows the lead principal components derived from the set of S's that represent the problem at hand. The principal components are directions in the n-dimensional space that contain decreasing variability. It is useful to use the first principal component to emphasize the variability between the target and the background. Combinations of principal components are used to identify materials. Principal components are the eigenvectors of the covariance matrix constructed as follows:

$$\Sigma = T^t \cdot T, \qquad \text{Eq. 3}$$

where T represents a training set of mean centered spectra that is any size from $[1 \times n]$ to $[\infty \times n]$, and $\Sigma$ is always $[n \times n]$, the superscript t indicates the matrix transpose. The greater the number of representative spectra contained as rows in T, the more certain it will be that $\Sigma$ is an adequate estimate of the true covariance matrix. When the eigenvectors of $\Sigma$ are calculated, they appear in descending order of corresponding eigenvalue. The relationship being:

$$\Sigma x = \lambda x, \qquad \text{Eq. 4}$$

where $\lambda$ is a scalar eigenvalue and x is an eigenvector. The numerical values for the elements in the eigenvector can be either positive or negative. The highest value eigenvalue is coupled with a particular eigenvector, which now becomes the first principal component. Linear combinations of the principal components can be developed into spectral basis vectors, $\phi_j(\lambda_i)$, that maximally separate the scene's component materials. The more of these linear combinations that are retained, the better the discrimination of the material types. Sometimes a single vector is all that is required to discriminate between target and background, $\phi_{target}(\lambda_i)$.

The magnitudes and signs of the various elements of this spectral basis vector are used to determine the amount of attenuation that needs to be introduced by the spatial light modulators in their respective spectral bins in one or the other of the two beams of collected light in the optical system of this invention.

Figure 1B:
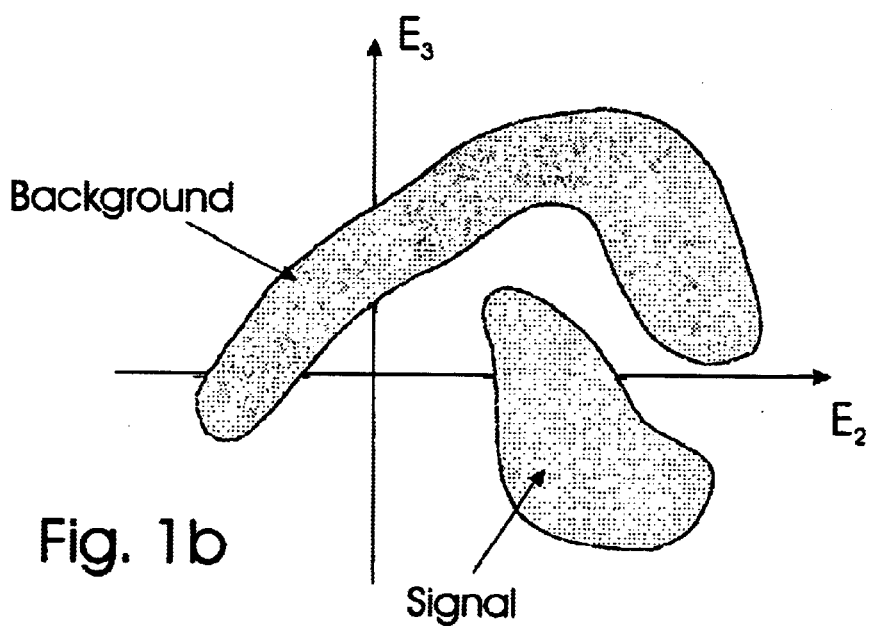
FIG. 1b is a graph showing a scatter plot of the clustering for two dimensions of target and background spectral signatures in a reference database.

The basis vectors shown in FIG. 1 are orthogonal to one another, and so can qualify as eigenvectors. This is a desirable quality and seems to maximize the separation of regions such as the "target" and "background" in the non-limiting example discussed in conjunction with FIGS. 1a, 1b and 2. However, when there are several target materials being sought and only a limited number of basis vector channels, then greater overall differentiation may be achievable when the basis vectors are not orthogonal.

A spectral basis vector is defined in this application to have the following property:

$$S_{target}(\lambda_i) \cdot \phi_{target}(\lambda_i) > S_{bkgd}(\lambda_i) \cdot \phi_{target}(\lambda_i) \cdot \{1+\alpha\} \qquad \text{Eq. 5}$$

where the constant p is large enough to easily differentiate the output signal of a target-filled pixel from one filled with any of the possible background materials. This must be true in the presence of all noise sources that may be encountered. Extreme limits on the spectral vector's components are $$-1 \leq \phi_{target}(\lambda_i) \leq +1 \qquad \text{Eq. 6}$$

All of the spectral basis vectors of interest usually have both positive and negative parts.

Splitting the spectral basis vector, $\phi_{target}(\lambda_i)$, into two parts enables all of the positive components to be put in one vector, $P_{target}(\lambda_i)$, and all the negative components to be put in another, $N_{target}(\lambda_i)$. Thus, $$\phi_{target}(\lambda_i) = P_{target}(\lambda_i) - N_{target}(\lambda_i) \qquad \text{Eq. 7}$$

where all of the components of $P_{target}(\lambda_i)$ and $N_{target}(\lambda_i)$ are positive. Thus, the values of $P_{target}(\lambda_i)$ and $N_{target}(\lambda_i)$ can have values from zero to one (+1). Therefore, specially configured optics and the variable gain TDI electronics can be used to take the dot product described by Equation (5). For example, the dot product of the collected hyperspectral signal in a pixel and the positive part of the basis vector for target, $$C^+_{target} = S_{Scene}(\lambda_i) \cdot P_{target}(\lambda_i) \qquad \text{Eq. 8}$$

can be directed toward a first channel. (This hardware will be explained in more detail below). Similarly, the negative part of the product, $$C^-_{target} = S_{scene}(\lambda_i) \cdot N_{target}(\lambda_i), \qquad \text{Eq. 9}$$

can be directed toward a second channel.

In a simplified target detection example, this difference can be normalized to remove the effects of solar flux, shadowing, etc. by dividing by the sum of the two components;

$$F(\text{likelihood})_{target} \Im = (C^+_{target} - C^-_{target})/(C^+_{target} + C^-_{target}) \qquad \text{Eq. 10}$$

There will be target material located in the pixel if this value is greater than some empirically pre-determined constant $K_{target}$;

$$\text{Likelihood}_{target} > K_{target} \qquad \text{Eq. 11}$$

Values less than this indicate a probability that only background materials are in the scene.

More complex target detection techniques using multiple vector measurements can be found in the references noted above.

Equations 7–9 give a proper description of the basis vectors for systems that do not utilize all of the light collected by the system. In these systems, one channel will receive a full spectrum of light, but will only process either the spectral bins that correspond to the positive (or negative) components of the spectral basis vector, thus throwing away the light in the unprocessed spectral bins. However, other systems that utilize all of the light require a different formalism as described below in conjunction with Eqns. 12–15.

To avoid throwing away light from the image scene and find "target" material in only a single channel, a portion of the system should be programmed to operate only on the light in the spectral bins that correspond to the positive components of the spectral basis vector to achieve to the following spectral filter function:

$$Q^+_{target}(\lambda_i) = \{1 + \Phi_{target}(\lambda_i)\}/2. \qquad \text{Eq. 12}$$

Therefore the detector's output signal for that channel, summed by the detector, will be proportional to:

$$O^+ = Q^+_{target}(\lambda_i) \cdot S_{scene}(\lambda_i), \qquad \text{Eq. 13}$$

The residual light is directed to another portion of the system that only processes the light in those bins that correspond to the negative components of the spectral basis vector, and the detector output from this portion will then be proportional to:

$$O^- = \{1 - Q^+_{target}(\lambda_i)\} \cdot S_{scene}(\lambda_i), \qquad \text{Eq. 14}$$

The "normalized" dot product of the spectral radiance of the scene and the spectral basis vector for target, Equation(5), is proportional to the difference between the two detector signals divided by the sum:

$$S_{scene}(\lambda_i) \cdot \Phi_{target}(\lambda_i) = K(O^+ - O^-) \div (O^+ + O^-) \qquad \text{Eq. 15}$$

where K is a constant. This result can also be intensity normalized using a similar technique shown in Eq. 10.

Another important part of the invention is the variable gain TDI (VGTDI) electronics package. VGTDI, as a part of an integrated spectral imaging sensor system, allows on focal plane spectral processing of an image, greatly reducing the computational requirements compared to a hyperspectral imager. When used in the sensor system of this invention, the VGTDI will include a wedge or stepped spectral filter that will pass only the desired bandwidth of light into the spectral bin beneath it. The VGTDI electronics themselves are based on the conventional time delay and integrate approach. TDI is used with scanning sensor systems to improve the signal to noise ration by transferring and accumulating the signal on the focal plane in synchronization with the image scan across the focal plane. The basic TDI technique uses the motion of the scene over the detector array to synchronously sum up multiple samples of the same scene point, increasing the signal to noise ratio (SNR) of the measurement. Utilization of focal planes yields a $N^{0.5}$ improvement in SNR, where N is the number of synchronously added steps. This advantage is not possible in any generally utilized hyperspectral imaging configuration. TDI can be accomplished on the focal plane using charge couple device (CCD) structures or off the focal plane using a computer. The VGTDI concept allows a different gain to be applied to the signal for each stage (corresponding to a spectral bin in the sensor) of TDI, and selected stages of TDI may be skipped altogether (gain of zero). Certain versions of VGTDI allow both positive and negative gain values. The attributes of VGTDI are necessary for the integrated multi-spectral sensor described herein, in which the stages of TDI correspond to the spectral components or bins of the imaged scene that are operated upon by the spectral basis vector. The VGTDI concept can also be adapted to more conventional TDI imaging applications, allowing the gain of all the TDI stages to be adjusted to adapt to varying irradiance conditions.

The mathematics underlying the present invention and the variable gain TDI electronics now having been generally described above, we turn now to a description of a number of embodiments of the variable gain TDI electronics and of sensor systems utilizing these electronics and the spectral basis vector computations.

Figure 4A:
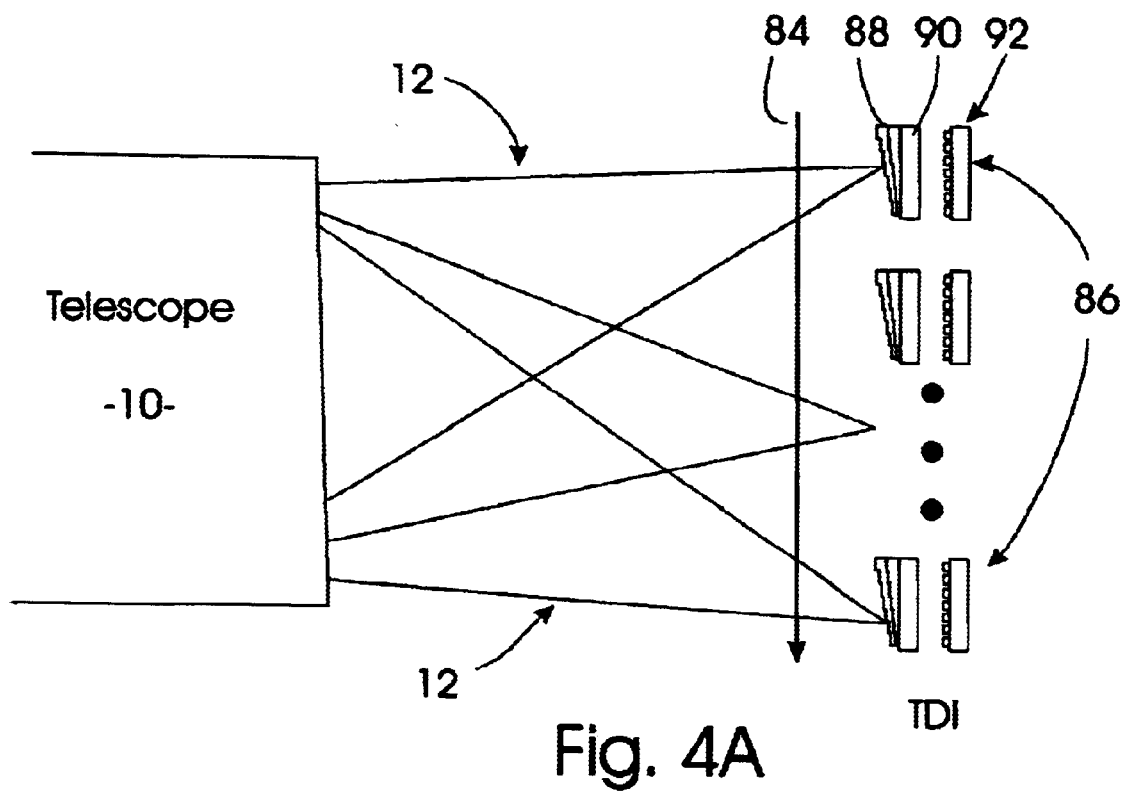
FIGS. 4a and 4b are diagrammatic side views of the overall system and the multispectral filter/TDI array assembly.
Figure 4B:
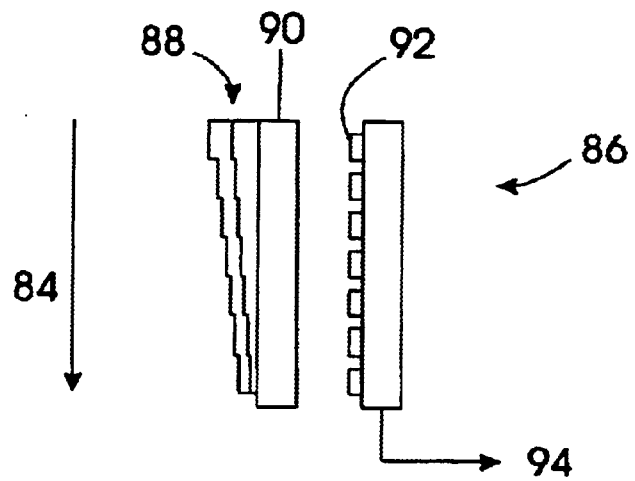

One implementation of TDI for the spectral basis vector processing contemplated by this invention is shown in FIGS. 4a and 4b. Referring to FIG. 4a, a TDI embodiment is depicted in which the spectral information from an object is obtained by using a TDI architecture. Light collector 10, typically a telescope, directs light 12 onto eight devices that take the dot product of the scene's optical spectra and four positive and four negative spectral basis vector components, the devices generally denoted 86. These devices extend into and out of the plane of the paper, in order to process a row of m-pixels. The discussion herein is for the pixel that is in the plane of the paper. An optical spectral filter 88 and an amplitude mask 90, both of which move in the scanning direction, are attached to the front of each TDI unit 92. Each spectral filter 88 selects the wavelengths into the spectral bins that are required by its corresponding spectral basis vector, and the amplitude mask 90 attenuates these wavelengths appropriately as a function of the amplitudes of the positive and negative components of the spectral basis vector. This embodiment is useful where it is not necessary to be able to reconfigure the attenuation levels for the spectral basis vectors. In these cases, a preset device can be used as the amplitude mask 90 instead of the controllable attenuation level devices discussed below. These preset devices could include a gray level transmission filter or an optical device that decreases the effective aperture through which the light can pass. Thus the spectral filter and the amplitude mask together comprise a fixed spatial light modulator. Programmable hyperspectral optical detectors 86 make up eight two-dimensional optical detector arrays 92 with TDI electronics driving each array. When used in satellite-borne applications, these TDI electronics cause the optoelectronic signals in the rows of pixels in the optical-detectors to be shifted at a rate matching the image motion of the earth (sweeping down the detector while in registry with the optical signal from the scene) as depicted in FIG. 4a by a ground track direction arrow 84. An optical stepped bandpass filter 88, such as a Fabry-Perot filter, is mounted in front of each TDI array 92 in order to pass the wavelengths desired for taking the dot product with the corresponding basis vector. There could be as many steps (one for each of the n spectral bins) in this filter as necessary for the particular application; only a few are shown in the figure. The spectral signals can be attenuated by a transmission filter 90 deposited on the stepped bandpass filter, the TDI, or on a separate substrate (as shown here).

FIG. 4b depicts one TDI unit. A spectral basis vector, described as $P_{target}$ in Eqns. (7) and (8), is programmed into the Fabry-Perot filter that may have about 30 stepped wavelength bands (fewer are shown in the figure). After the image of a ground pixel has moved across filter 88, the summed output signal (for example C+$_{target}$) 94 is read out. The next TDI unit showing in FIG. 4a might output C$_{target}$, Equation (9), so the two signals can be subtracted as in Equation (10) and the pixel can be examined for evidence of plastic. The ground pixel could then be examined to identify other materials using the remaining six TDI units. In this manner the eight arrays can process four different spectral basis vectors simultaneously. FIGS. 4a and 4b depict eight simulated slits (they would be perpendicular to the plane of the paper) as a result of the eight optical stepped bandpass filters 88. The entire image filter system can be programmed so no samples are taken in atmospheric absorption bands. There is no actual slit in this embodiment. One disadvantage to this embodiment is that it uses more than eight detector pixels per ground pixel. However, there are only eight numbers read out per ground pixel, and the required post-processing is minimal. This embodiment is able to omit most of the optical elements found in the embodiments in the related patent application (U.S. Serial No. 09/345,604), thereby reducing the size and weight of the system.

Figure 5:
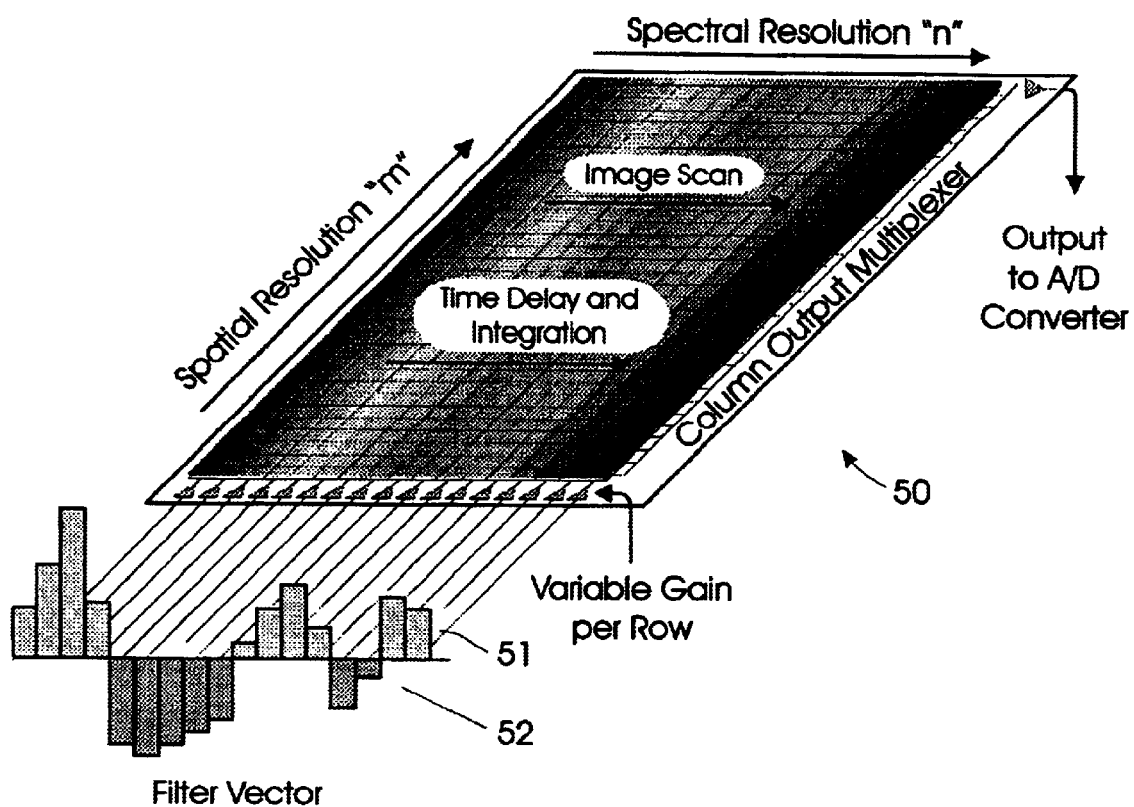
FIG. 5 is an isometric diagram of the TDI array and the interaction with the associated spectral basis vector.

The TDI units mentioned above can be implemented in several different ways. FIG. 5 shows the details of a single TDI array 50 in more detail. A wavelength filter, not shown, with the capability to pass the desired spectral bandwidth ("spectral bin") to each of the n rows in the underlying detector array. Spatial resolution is provided in one dimension as shown along the length of the row. This dimension is perpendicular to the plane of the paper in FIGS. 4a and 4b. Spectral resolution (the n spectral bins) is provided in the other direction as shown. As the image is scanned in the spectral direction, the focal plane array 92 transfers and accumulates the signal in synchronization with the image scan. The variable gain time delay and integrate (VGTDI) feature allows a variable gain for each row (corresponding to the attenuation level specified for a positive 51 or negative 52 component of the spectral basis vector being used) and, therefore, each spectral bin. By having the variable gain capability present in the TDI detector array, the transmission filter 90 in FIGS. 4a and 4b is no longer needed. This enables the spectral basis vector operation to be done on the focal plane rather than in an external computer.

Figure 6:
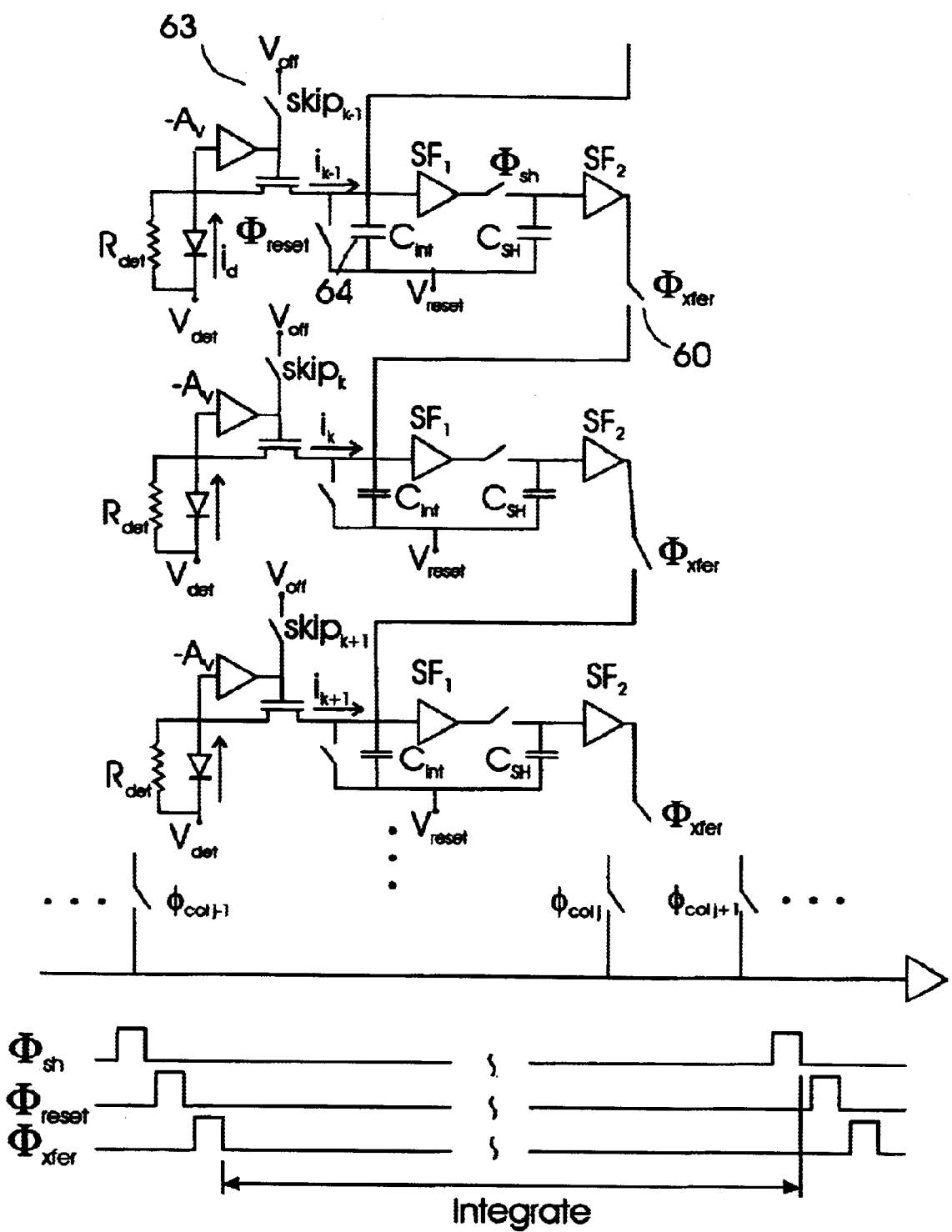
FIG. 6 is a schematic diagram of the buffered direct injection embodiment of the VGTDI and an associated timing diagram.
Figure 7:
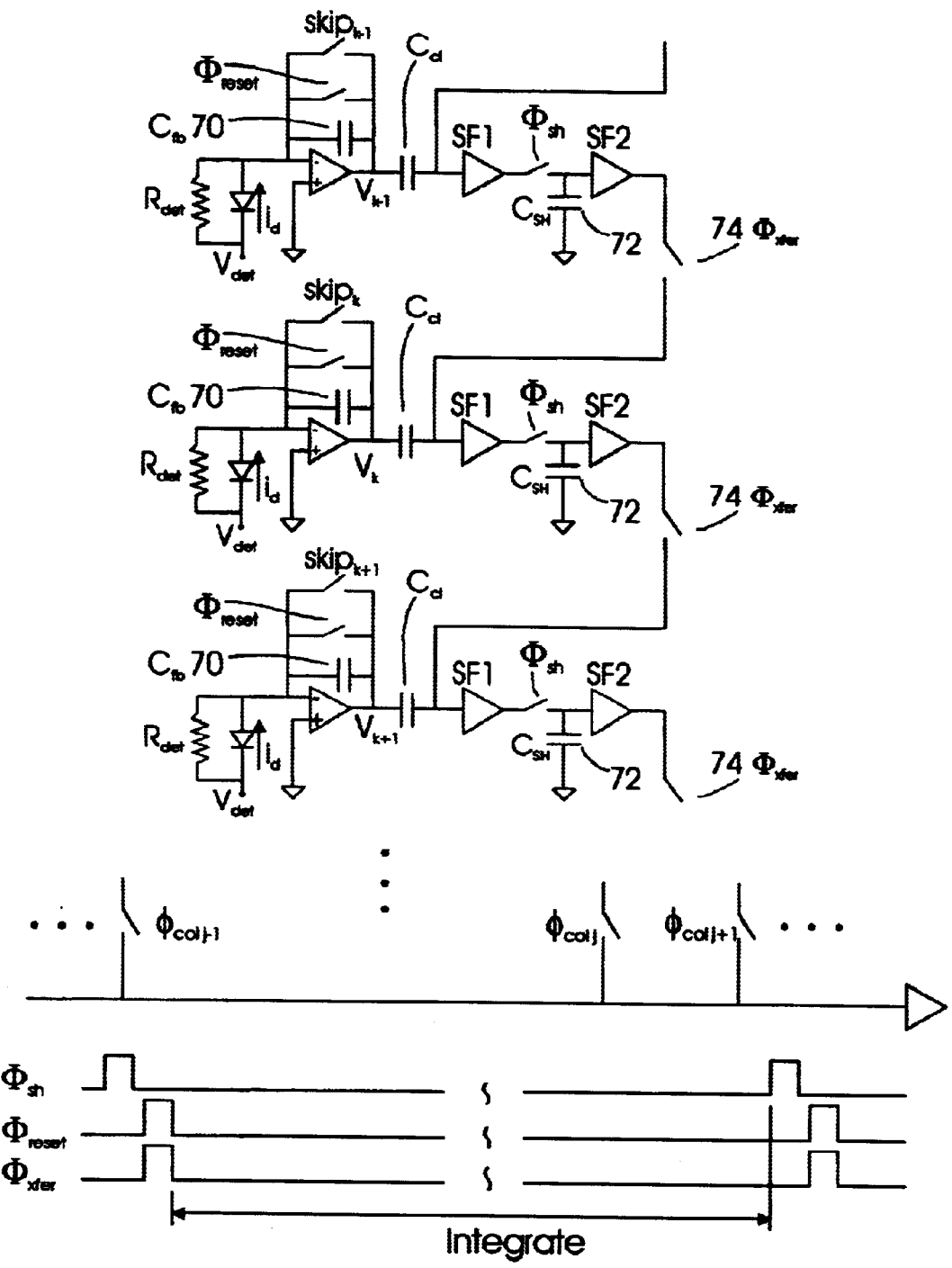
FIG. 7 is a schematic diagram of the capacitance feedback transimpedance amplifier embodiment of the VGTDI and an associated timing diagram.

There are two basic approaches to the VGTDI concept, depending on the unit cell design. The BDI-VGTDI approach in FIG. 6 is based on the buffered direct injection (BDI) unit cell. The CTIA-VGTDI approach in FIG. 7 is based on the capacitive feedback transimpedance amplifier (CTIA) unit cell. In FIGS. 6 and 7, the scan direction is vertical and the frame time matches the scan dwell time on each row. In the BDI-VGTDI diagram the signal integration node is $C_{int}$ 64 and in the CTIA-VGTDI diagram, the integration node is $C_{fb}$ 70. The signal stored on the sample and hold capacitor 62 for a pixel in a given row is transferred to the pixel in the same column of the next row and added to the signal of that pixel. Row by row, the signal accumulates for each column of pixels in synchronization with the image scan. If the skip row switch 63 is closed for a given row, no signal is added for that row, but the previously accumulated signal is passed along to the next row.

The BDI-VGTDI approach is shown in FIG. 6. The detector current, $I_d$, flows through the injection field effect transistor (FET) and is integrated on $C_{int}$ for a given integration time, $\Phi_{int}$. The purpose of the injection FET is to present a low impedance to the detector and to reduce the voltage change seen by the detector as the charge on the integration capacitor changes. The negative feedback amplifier connected to the gate of the injection FET improves the capability of this unit cell design under conditions of low detector current.

A sample and hold capacitor 62 is commonly added to a unit cell to allow snapshot mode integration. In snapshot mode, the signals from all pixels are simultaneously transferred to the sample and hold capacitors within the unit cells.

After the signals are sampled, the integration capacitors are reset and integration of detector current for the next frame begins. During this integration period, the sample and hold capacitors for all the pixels are sequentially accessed and read out. The source follower amplifiers, SF1 and SF2, provide near unity gain and maintain the signal voltage through sampling and readout.

The technical advance shown in the BDI-VGTDI diagram is the connection, through a transfer switch 60, of the sample and hold output of a pixel to the integration node of the pixel in same column of the next row. By placing the voltage signals from one row's pixels onto the integration nodes of the next row's pixels before detector current integration begins, the total signal can be accumulated and transferred from one TDI stage to the next.

The sequence of the sample and transfer processes is shown in the timing diagram at the bottom of FIG. 6. At the end of the detector current integration period the sample and hold switch, $\Phi_{xfer}$, is closed, transferring the signal voltage to the sample and hold capacitor, $C_{sh}$. After the sample and hold switch is opened the two sides of the integration capacitor are shorted together with the reset switch, $\Phi_{reset}$, and the drain of the injection FET is set to the reset reference voltage, $V_{reset}$. After $C_{int}$ has been reset the transfer switch, $\Phi_{xfer}$, is closed and the signal voltage for a given pixel is placed onto the integration capacitor of the pixel in the same column of the next row. When the transfer switch is opened, detector current integration begins, and the total signal voltage in a given pixel is the sum of transferred signal voltage and the new signal voltage for the current integration period.

An important feature of this concept is the capability of selecting rows for which the detector signal is not added, but the accumulated signal from previous rows is passed through. This is accomplished by closing the skip row switch 63. This is a simple technique for amplitude modulation for the detector signals for the various spectral bins (rows). When this switch is closed the gate of the injection FET is set to $V_{off}$, and the injection FET is turned off, stopping any detector current from flowing onto the integration capacitor. The accumulated signal from previous rows is held on $C_{int}$, transferred to $C_{sh}$, and then passed along to the next row. The pattern of rows to be added or skipped can be quickly set up or changed before an image acquisition by setting the appropriate skip row switches.

The CTIA-VGTDI approach is shown in FIG. 7. Detector current is integrated on the feedback capacitor, $C_{fb}$, 70 and a signal voltage equal to the integrated detector current divided by the feedback capacitance is produced at the amplifier output. A sample and hold capacitor 72 is commonly added so that snapshot mode integration can be used. A clamp capacitor, $C_{cl}$, is sometimes added to the CTIA unit cell to provide a form of correlated double sampling as well as to level shift the signal for downstream electronics. The side of $C_{cl}$ opposite the unit cell amplifier is connected through a switch to a clamp reference voltage. When the feedback capacitor is reset using $\Phi_{rst}$, the clamp switch, $\Phi_{cl}$ is closed simultaneously, placing a known voltage across the clamp capacitor. At the end of the integration period, the total signal placed on the sample and hold capacitor is the sum of the clamp voltage and the signal voltage.

The advance shown in the CTIA-VGTDI diagram is the connection, through a transfer switch 74, of the sample and hold output of a pixel to the clamp capacitor of the pixel in same column of the next row. In effect, the outputs from one row's pixels become the clamp voltages for the next row's pixels, and the signals are accumulated row by row. As with the BDI-VGTDI, a given row can be selected or skipped by opening or closing the skip switch. When the skip switch is closed, the input amplifier is continuously held in reset and no detector current is integrated. The accumulated signal from previous rows is passed through to the next row.

The sequence of sample and transfer processes is similar to that of the BDI-VGTDI and is shown at the bottom of FIG. 7. Because the accumulated signal is placed on the clamp capacitor instead of the integration node (feedback capacitor), the reset and transfer clocks can occur simultaneously.

Figure 8:
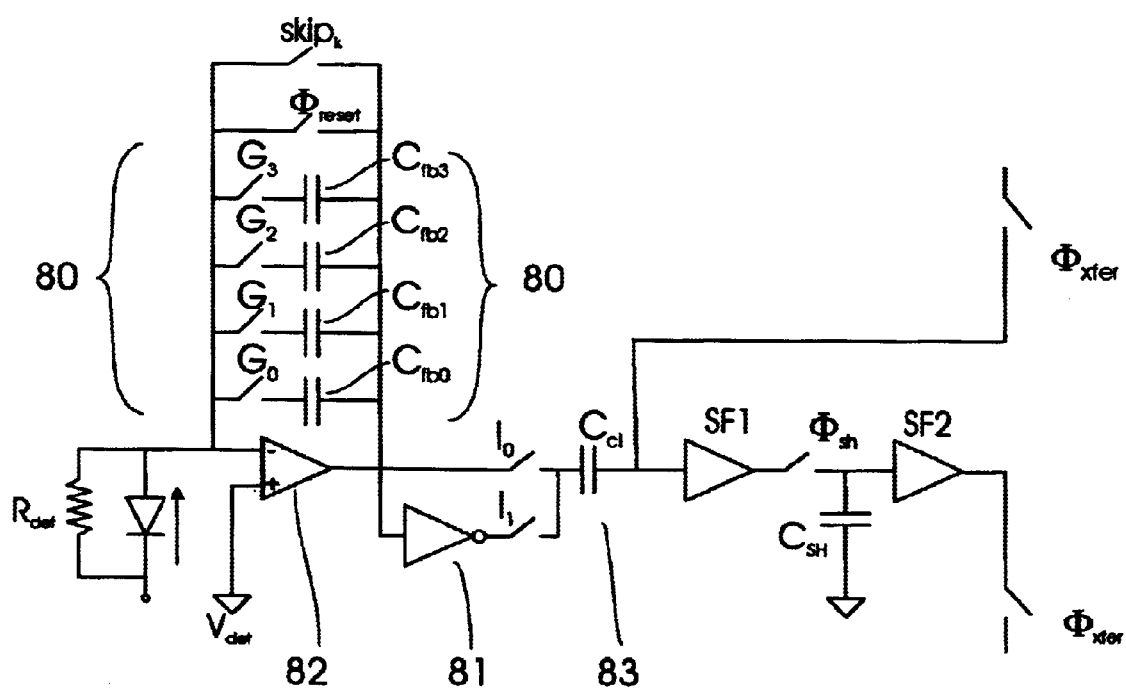
FIG. 8 is a schematic diagram of the capacitance feedback transimpedance amplifier embodiment of the VGTDI additionally including an inverter and an associated timing diagram.

The CTIA-VGTDI offers an additional capability of selectable gain for each row. In addition to turning each row totally on or off with the skip row switch, a slight modification to the circuit shown in the diagram allows variable and selectable gain values for each row. As shown in FIG. 8, the single feedback capacitor 70 for the input amplifier is replaced with a set 80 of selectable capacitors. Closing the switches to all the capacitors results in a low conversion gain (volts per electron); selecting only a small capacitor yields a high conversion gain. The resolution in gain selectability depends on the number of capacitors and switches included in each unit cell. In this way, each row's contribution to the total accumulated signal can be selected or changed before an image acquisition. This row by row gain selectability is an important feature and allows more precise selection of row weighting factors. One further refinement on the CTIA-VGTDI concept shown in FIG. 8 is the use of negative gain factors. An inverting voltage amplifier 81 with a gain of −1 can be switched in or out between the input amplifier 82 and the clamp capacitor 83. The inverter and gain value selections can be made on a row by row basis to provide additional control of a particular row's contribution to the total signal.

This concept is different from conventional TDI in two principal ways. The signal gain for each TDI stage is variable and the signal transfer and accumulation is accomplished without the use of CCD structures. First, conventional TDI that is performed on the focal plane uses a constant gain value for each TDI stage, and this value is fixed. The VGTDI concept allows a different gain value for each stage and this gain can be easily reprogrammed. If TDI is performed off the focal plane in a computer, a variable gain could be applied by the computer, but the VGTDI can accomplish this task on the focal plane.

Conventional TDI typically uses CCD structures and performs the signal transfer and accumulation functions in the charge domain. CCDs require specialized integrated circuit processing steps to create the necessary structures. The VGTDI concept performs the signal transfer and accumulation functions in the voltage domain and uses standard complementary metal oxide semiconductor (CMOS) processing techniques.

The VGTDI concept is an improvement over existing technology in both performance and economy. It provides selectable and programmable gain for each stage of TDI can be achieved on the focal plane, which is not possible with conventional on focal plane TDI. This feature is essential to the integrated ISIS system concept. Conventional TDI performed off the focal plane could provide programmable gain, but would require more pixels to be read out in the same frame time. Under many circumstances, this higher readout rate would lead to greater readout noise and lower performance.

The VGTDI concept uses standard CMOS integrated circuit processing which is less expensive than specialized CCD processing. Prototyping and production costs would be less than conventional on focal plane TDI. Using CMOS processing for the sensor chip also makes possible the integration of more complex signal processing functions on the focal plane, including analog to digital conversion. The higher level of integration made possible with an all CMOS design leads to lower system cost.

This invention can be applied to hyperspectral remote sensing programs funded by government and industry. There are also applications in medical imaging. Focal plane arrays are very often specialized designs for particular applications. The integrated circuit design process would be very similar to conventional approaches. Fabrication of prototype and production focal plane arrays should be 25–40% lower than conventional approaches due to the use of standard CMOS processing techniques. System costs for an integrated system built with the teachings of this application could be 20–60% lower than conventional hyperspectral imaging systems because of reduced system complexity and lower computational requirements.

Although the invention has been described above in relation to the preferred embodiments thereof, it will be apparent to those skilled in the art that variations and modifications can be effected in these embodiments without departing from the scope and spirit of the invention.

What is claimed is:

1. A multispectral sensor in which an image of a scene is in motion relative to an image plane wherein the sensor emphasizes at least one aspect of the scene comprising:

optical apparatus to focus the scene onto an image plane;

at least one time delay and integrate (TDI) detector array located at the image plane and having m detector elements in each row, where the rows are oriented perpendicular to the direction of motion, and n rows of detector elements to form an m x n array; and a multispectral filter above each of the at least one TDI arrays, the multispectral filter passing a separate bandwidth (spectral bin) of light from the scene onto each of the n rows;

wherein the at least one TDI array contains means to accumulate successively the signals from detector elements in successive rows as pixels in the scene move across the detector elements along the direction of motion and means to vary the amplitude of the signals from selected detector elements to emphasize the at least one aspect of the scene.

2. The sensor of claim 1 wherein the means to vary the amplitude is responsive to the magnitudes of the positive and negative components of a spectral basis vector that is derived from a training set of a multiplicity of n element spectra that includes at least one spectrum of the aspect to be emphasized and at least one spectrum of the constituents of the background materials in the scene.

3. The sensor of claim 2 wherein the positive components are applied to the appropriate detector signals from a first of the at least one TDI arrays, the negative components are applied to the detector signals from a second of the at least one TDI arrays, and the sensor further includes means to subtract the accumulated signal from the second TDI array from the accumulated signal from the first TDI array to thereby emphasize the at least one aspect of the scene.

4. The sensor of claim 2 wherein both the positive and negative components of the spectral basis vector are applied to the appropriate detector signals in a single one of the at least one TDI arrays, and the TDI arrays further include inverters associated with each detector element that invert the signals from those detectors associated with the negative components of the spectral basis vector to thereby emphasize the at least one aspect of the scene.

5. The sensor of claim 1 wherein the means to vary the amplitude comprises a switch that cuts off the signal from a selected element.

6. The sensor of claim 1 wherein the means to vary the amplitude comprises a ladder of switches with associated capacitors to vary the gain of a selected element.

7. The sensor of claim 2 wherein the means to vary the amplitude comprise amplitude masks located above selected detector elements that control the amount of light falling upon the detector elements.

8. The sensor of claim 2 wherein a plurality of different spectral basis vectors are utilized with separate TDI arrays.

9. A time delay and integrate detector array that receives spectrally filtered light on a plurality of rows of detector elements, each row defining a unique frequency bin and including individual means for weighting the amplitude of the output signals of the row prior to accumulation of said weighted row output signals.

* * * * *